United States Patent [19]

Aramini

[11] Patent Number: 5,019,193

[45] Date of Patent: May 28, 1991

[54] ARRANGEMENT FOR AND METHOD OF APPLYING HEAT-TRANSFERRABLE DECALCOMANIA TO MUGS

[75] Inventor: Salvatore Aramini, Massapequa, N.Y.

[73] Assignee: Speedy Die, Inc., Deer Park, N.Y.

[21] Appl. No.: 237,540

[22] Filed: Aug. 29, 1988

[51] Int. Cl.[5] .............................................. B32B 31/00

[52] U.S. Cl. ....................................... 156/64; 156/215; 156/240; 156/366; 156/378; 156/492; 156/579; 156/583.3; 156/DIG. 41; 219/549

[58] Field of Search .................. 219/549; 156/64, 230, 156/240, 358, 359, 366, 367, 368, 378, 475, 493 X, 499, 540, 583.3, DIG. 5, DIG. 8, DIG. 12, DIG. 13, DIG. 14, DIG. 36, DIG. 41, DIG. 51, 215, 579 X, 486, 492 X

[56] References Cited

U.S. PATENT DOCUMENTS

| | | | |
|---|---|---|---|
| 614,689 | 11/1898 | Beauregard et al. | 156/475 |
| 2,204,219 | 11/1937 | Jahne et al. | 156/481 |
| 3,027,923 | 4/1962 | Schreiber | 144/266 |
| 3,393,297 | 7/1968 | Hart | 219/549 |
| 3,434,902 | 3/1969 | Bliss | 156/493 |
| 3,979,248 | 9/1976 | Kussmaul | 156/359 |
| 4,379,018 | 4/1983 | Griesdorn | 156/368 |
| 4,708,608 | 11/1987 | DiRocco | 156/583.3 |
| 4,804,433 | 2/1989 | Smith | 156/359 |
| 4,874,454 | 10/1989 | Talalay et al. | 156/359 |

*Primary Examiner*—David A. Simmons
*Assistant Examiner*—Chester T. Barry
*Attorney, Agent, or Firm*—Darby & Darby

[57] ABSTRACT

An arrangement for and method of applying heat-transferrable decalcomania to a generally cylindrical cup portion of a handled mug comprises tightly wrapping a flexible sheet-like heating blanket around at least a major portion of the circumferential surface of the cup portion over which the decalcomania has been laid, thereby pressing the decalcomania against the cup portion. Heat is generated at the blanket in an amount sufficient to transfer the decalcomania to the cup portion.

8 Claims, 7 Drawing Sheets

ARRANGEMENT FOR AND METHOD OF APPLYING HEAT-TRANSFERRABLE DECALCOMANIA TO MUGS

BACKGROUND OF THE INVENTION

1. Field of the Invention

This invention generally relates to an arrangement for and a method of applying heat-transferrable decalcomania to a circumferential surface of a container and, more particularly, to applying such decalcomania to a generally cylindrical cup-shaped portion of a mug.

2. Description of Related Art

It is well known to apply a heat-transferrable decalcomania, commonly known as a decal, to clothing such as T-shirts. The T-shirt is typically laid on a flat support surface, and a desired decal is laid on the so-supported shirt. The decal has a peel-off protective sheet facing away from the shirt. Thereupon, a pressing device engages the protective sheet and, under the simultaneous application of pressure and temperature, transfers the decal to the shirt. The affixation of the decal to the shirt is completed by removing the protective sheet.

Existing T-shirt pressing devices cannot be used when it is desired to apply such decals to curved surfaces and, more particularly, to the generally cylindrical cup-shaped portion of a handled mug, due to the curvature of the mug. To properly affix the decal, uniform pressure and temperature must be applied over the entire expanse of the decal and, in turn, over that cylindrical portion of the mug that is overlaid with the decal. To that end, it has been proposed to press a rigid, bulky, heated, curved, metal casting toward one side of the cup-shaped portion of the mug, or to hinge together two such metal castings and to press the latter toward both opposite sides of the cup-shaped portion of the mug.

Although the use of curved castings is generally satisfactory for its intended purpose of applying a decal on a curved surface, such curved castings have not proven altogether desirable in use. First of all, it is often desirable to apply to the cup large decals, i.e. those which extend around the cup-shaped portion over an arc length greater than 180°. The known castings can only effectively apply small decals to one or a plurality of areas on the cup-shaped portion of the mug.

Secondly, the rigid castings do not permit mugs of different sizes to be accommodated in a single apparatus. An 8-oz. mug requires a different casting than a 12-oz. mug due to their different radii of curvature. As a result, the known rigid castings can only readily handle a single mug size. Different castings of different sizes would be required to handle different sized mugs.

Thirdly, the known metal castings have a relatively large mass, and consume a great deal of electrical energy in the process of heating up such a mass to the desired temperature. At the same time, the known castings cool very slowly and, hence, a potential safety problem exists for the operator.

SUMMARY OF THE INVENTION

1. Objects of the Invention

It is a general object of this invention to overcome the aforementioned drawbacks of prior art arrangements for applying decals to mugs.

It is another object of this invention to reliably affix a decal to a major portion of the curved surface of a mug.

Yet another object of this invention is to uniformly apply pressure and heat over the entire expanse of the decal to be affixed to a mug.

Still another object of this invention is to reliably apply decals to mugs of different sizes without having to interchange components or retrofit the arrangement.

A further object of this invention is to reliably affix a decal to a mug with a minimal expenditure of energy.

Another object of this invention is to reliably protect an operator from being burned by exposed heated components.

A still further object of this invention is to provide an easy-to-use, energy-efficient, safe and rapid arrangement for applying large sized decals to mugs of various size.

2. Features of the Invention

In keeping with these objects, and others which will become apparent hereinafter, one feature of this invention resides, briefly stated, in an arrangement for and a method of applying a heat-transferrable decal to a circumferential surface of a container, e.g. a generally cylindrical cup of a handled mug. A flexible sheet-like heating blanket is mounted on a support and bounds therewith an open cavity into which the cup of the mug is at least partly received. The blanket extends along a longitudinal axis that lies lengthwise of the cup. The blanket also extends circumferentially about the axis, and preferably around a major portion of the cup which extends over an arc greater than 180°. The blanket thus wraps said major portion of the cup and sandwiches the decal between itself and the major portion of the cup.

According to this invention, means are provided for pressing the blanket and, in turn, the decal into close, intimate, heat-transfer contact with the major portion of the cup. Heater means are provided for heating the blanket and the decal to transfer the latter to the major portion of the cup. As previously noted, the heat-transferrable decal is overlaid with a peel-off protective sheet. The affixation of the decal to the cup is completed by removal of the protective sheet.

The blanket preferably has opposite end regions stationarily secured to the support, as well as a movable contact region between the end regions. The pressing means pushes the contact region and tightly wraps the blanket over the major portion of the cup during heating. When cups of different diameter are respectively received in the cavity, the pressing means will push the contact region of a respective cup through different distances in order to accommodate the diameter of the cup received in the cavity. In this way, differently sized mugs can be accommodated in the same arrangement without having to retrofit the same.

Advantageously, the heater means includes electrically-resistive elements, e.g. resistive wires or foil, mounted in the blanket, and means for conducting an electrical current through the resistive elements to generate heat within the blanket. The resistive elements are supported on a central support layer of the blanket. Outer and inner layers are provided at opposite respective sides of the central support layer, and are preferably constituted of a heatresistant material.

In use, an operator manually sets the temperature of the heat to be generated at the blanket. Sensor means, e.g. a thermocouple, at the blanket detects the temperature thereat. An indicator, e.g. a lamp, indicates when the set temperature has been reached.

It is also advantageous to have the operator manually set the duration of time during which the heating is to be conducted. A timer times said time duration and, when said time duration has elapsed, an indicator, e.g. a buzzer, communicates this condition to the operator.

The flexible nature of the heating blanket and its tight wrapping over the height and around a major portion of the cup ensures a uniform application of pressure and heat over the entire expanse of the decal that is laid over the cup. The resistive elements are advantageously regularly spaced within the blanket so as to ensure that there are no local hot or cool spots and, thus, no uneven heating. Since the flexible blanket can be tightly wrapped around cups of different sizes, the arrangement can readily accommodate differently sized mugs. Since, in a preferred embodiment, the resistive elements are embedded within the heating blanket, the outer layer of the blanket, although warm to the touch, is not so hot as to expose the operator to burns or other injury.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Figure 7:
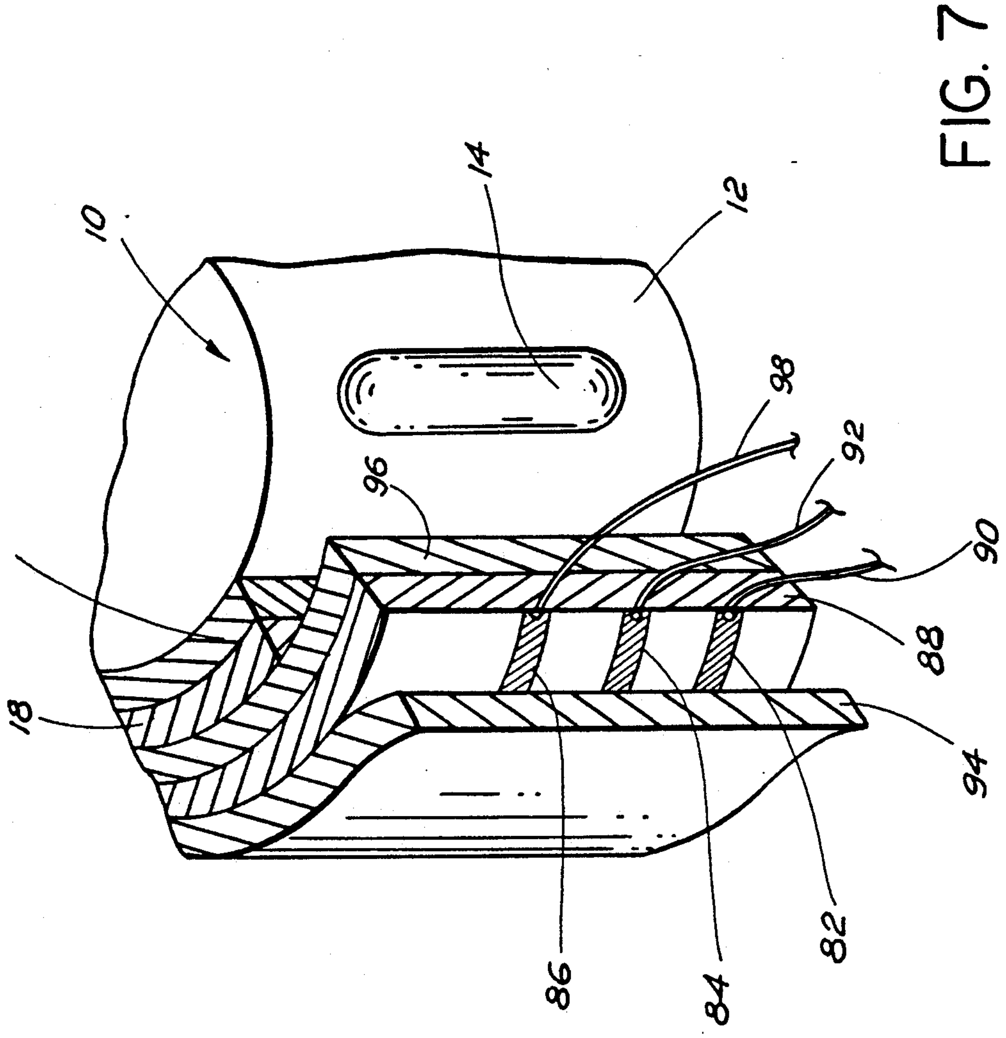
FIG. 7 is an enlarged partially broken-away view of one end region of the heating blanket in intimate contact with a mug.

Referring now to the drawings, reference numeral 10 generally identifies a container, preferably a mug, having a generally cylindrical portion or cup 12 and a handle 14. As best shown in FIG. 7, this invention proposes applying to the mug 10 a heat-transferrable decalcomania, commonly known as a decal, which is composed of a decorative picture or design printed on a sheet 16, the sheet being backed by a peel-off paper backing or protective sheet 18. Although this invention is described and illustrated in connection with a heavy drinking mug of earthenware which has a handle, it will be understood that the invention is not intended to be so limited. This invention broadly covers the application of a decal to any circumferential surface, and not necessarily that of a container, or a container having a cylindrical cup, or a cup having a handle, or a cup constituted of earthenware.

Figure 4:
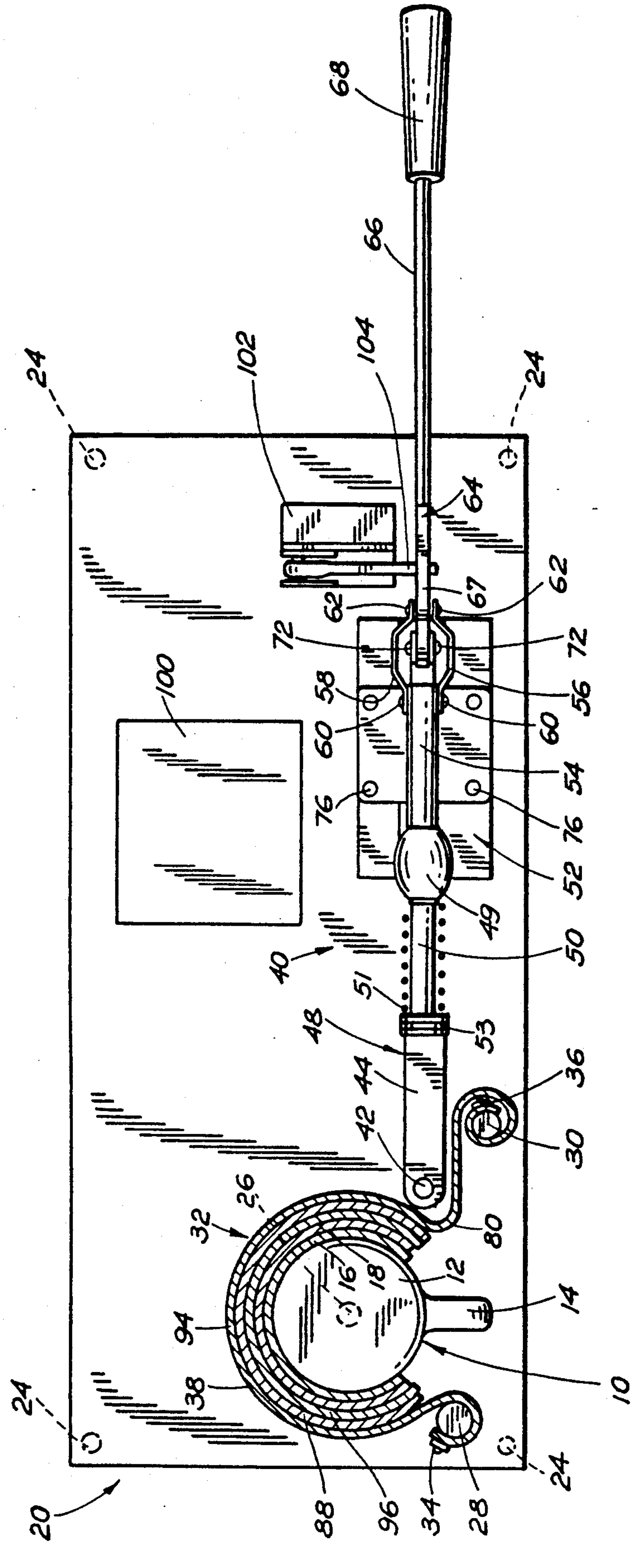
FIG. 4 is a top plan view of the components of FIG. 2, with electrical wiring removed for clarity.

As best shown in FIG. 4, an arrangement 20 for applying the decal in accordance with the method of this invention, to the cup 12 comprises a generally rectangular base 22 having cushioning feet 24, preferably constituted of rubber, at each corner of the base for supporting the arrangement on a support surface such as a table or countertop. A vertical support post 26 extends upwardly of the base 22, and is received with clearance within the interior of the cup of the inverted mug, i.e. a mug whose open end faces the base. A pair of spaced-apart vertical anchor posts 28, 30 also extend upwardly of the base, and are in mutual parallelism with the support post 26.

Figure 2:
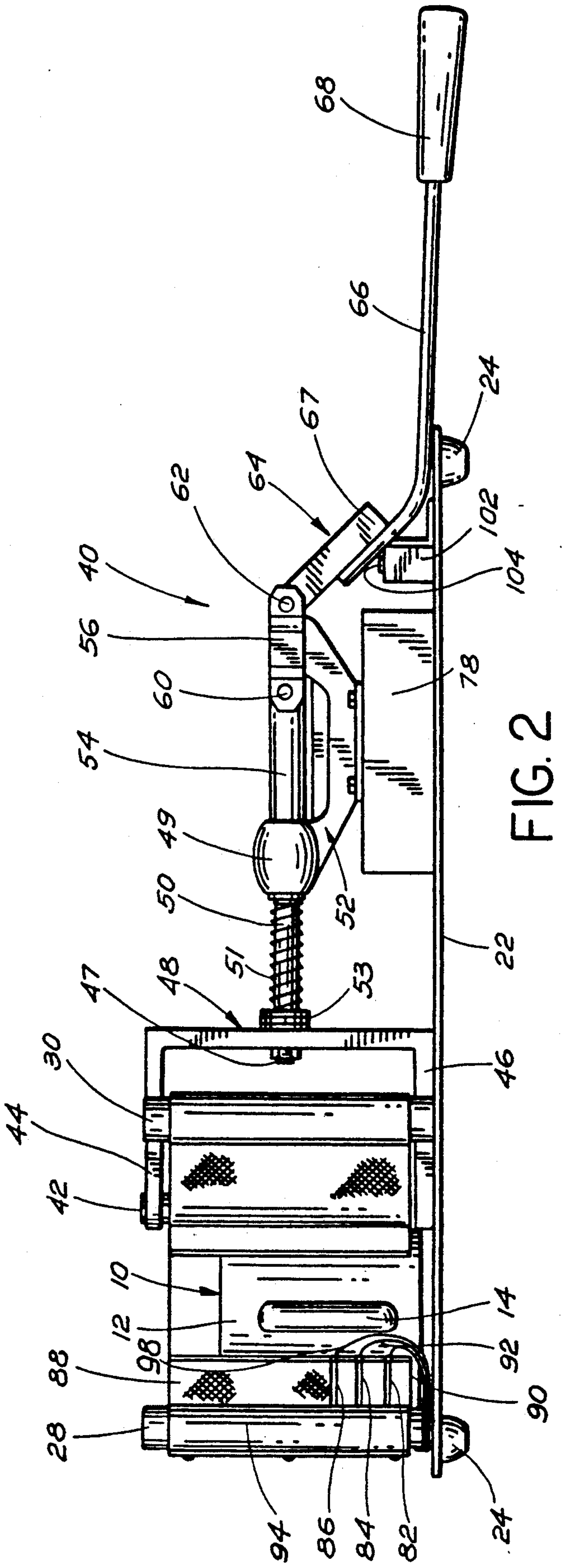
FIG. 2 is an elevational front view of some of the components housed within the interior of the arrangement of FIG. 1 in a ready condition prior to affixation of the decal to the mug.

A flexible sheet-like heating blanket 32, preferably of multi-layer construction, as described below in connection with FIG. 7, has opposite end regions 34, 36 stationarily secured to the anchor posts 28, 30. An intermediate region 38 of the blanket which extends between the end regions 34, 36 freely spans the distance between the anchor posts 28, 30. As shown in FIG. 4, the intermediate region 38 extends circumferentially around a major portion of the cup over an arc length that is greater than 180° as considered with respect to a vertical axis that extends along the elongation of the support post 26. As shown in FIG. 2, the blanket extends in a vertical direction axially along the entire height of the cup and also above the same so as to readily accommodate cups of different heights. The blanket bounds with the support a cavity having an open top so that the inverted mug can be axially received in the cavity. The blanket also bounds an open front so that the inverted mug can also be frontaly received in the cavity with the handle 14 extending outwardly of the open front.

When the cup is initially received in the cavity, the blanket, although generally conforming to the outer cylindrical surface of the cup, loosely surrounds the cup in a slack condition. Put another way, the blanket is not tightly wrapped in close intimate contact with the cup. Hence, a circumferential space exists between the slack blanket and the cup. The decal is received in said space, and is sandwiched between the blanket at one side and the cylindrical cup surface at its opposite side. The decal may be positioned around and on the cylindrical cup surface prior to insertion of the cup into the cavity or after the cup has been inserted therein.

A pressing assembly 40 is mounted on the base 22, and is operative for pressing the blanket 32 and, in turn, the decal into close intimate contact with the outer cylindrical cup surface. The assembly 40 moves the blanket from the ready condition shown in FIG. 2 in which the cavity formed by the blanket loosely receives the cup with a slight clearance, to the working or use condition shown in FIG. 3 in which the blanket is tightly wrapped around the cup and presses the decal against the same.

The assembly 40 includes a vertically upright push bar 42 having opposite ends which are mounted at the outer ends of arms 44, 46 of a three-sided stirrup 48. An elongated drive shaft 50 has one end 47 secured to the stirrup 48, and is mounted on a horizontally disposed guide 49 of a stationary bracket 52 for sliding movement along a horizontal direction. A coil spring 51, whose function is described in detail below, loosely surrounds the shaft 50, and has one end bearing against a shoulder 55 of a rear extension 54 of the shaft 50, and another end bearing against the stirrup 48 through the intermediary of a desired number of spacers or washers 53.

Figure 5:
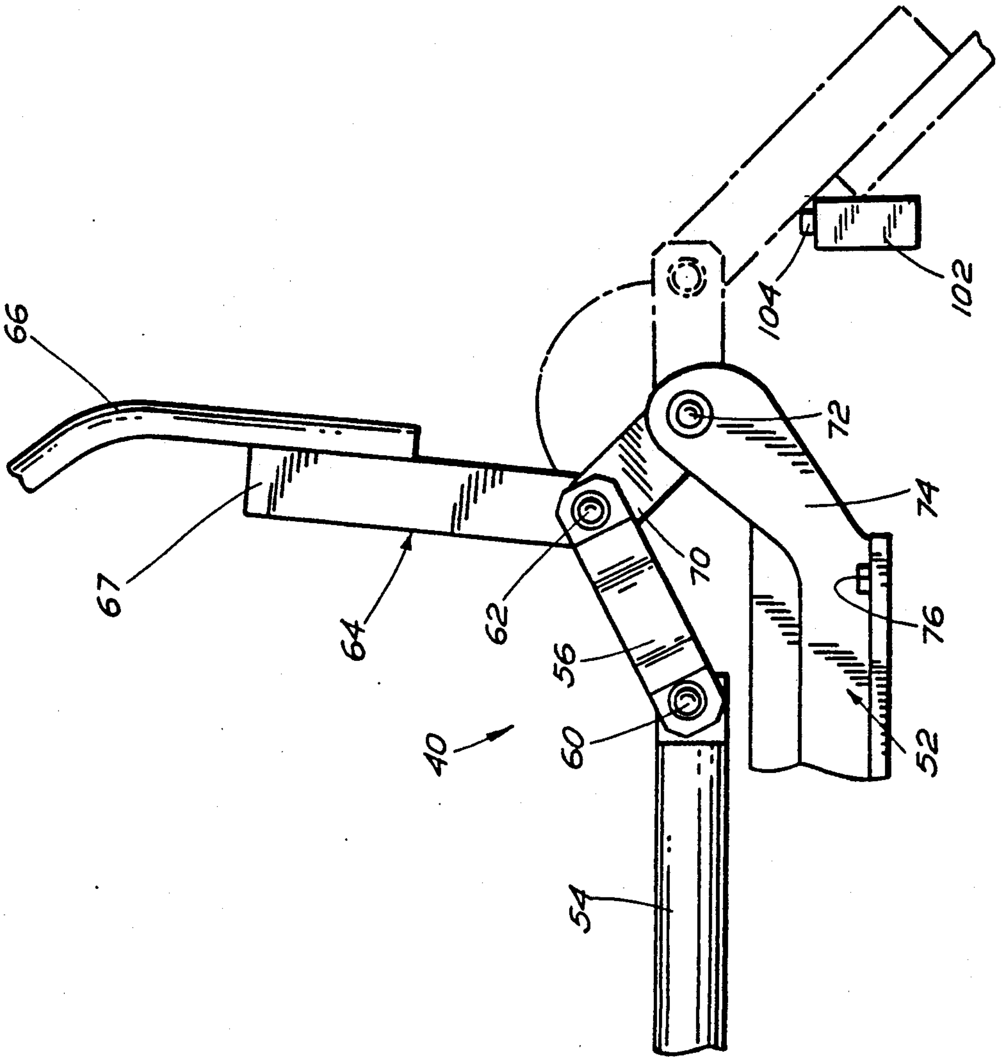
FIG. 5 is an enlarged partially broken-away view of some of the components during movement from the ready to the use condition.

As best shown in FIGS. 4 and 5, the shaft extension 54 is pivotably connected at pivot pins 60 at opposite sides of the shaft to front ends of twin stabilizer links 56, 58 whose opposite rear ends are pivotably connected at pivot pins 62 to an angled handle link 64. Handle link 64 has a longer arm 67 fixedly secured, e.g. by welding, to a manually-operated handle 66 having a grip 68 at an outer free end thereof, and a relatively shorter arm 70 whose outer end is pivotably connected at pivot pins 72 to a rear extension 74 of the stationary guide bracket 52. Handle link 64 is pivotably connected at pivot pins 62 to the rear end regions of the stabilizer links 56, 58 at the juncture between the longer arm 67 and the shorter arm 70 thereof. Guide bracket 52 is fixedly secured to a raised platform 78 on the base 22, preferably by threaded bolts 76.

Figure 3:
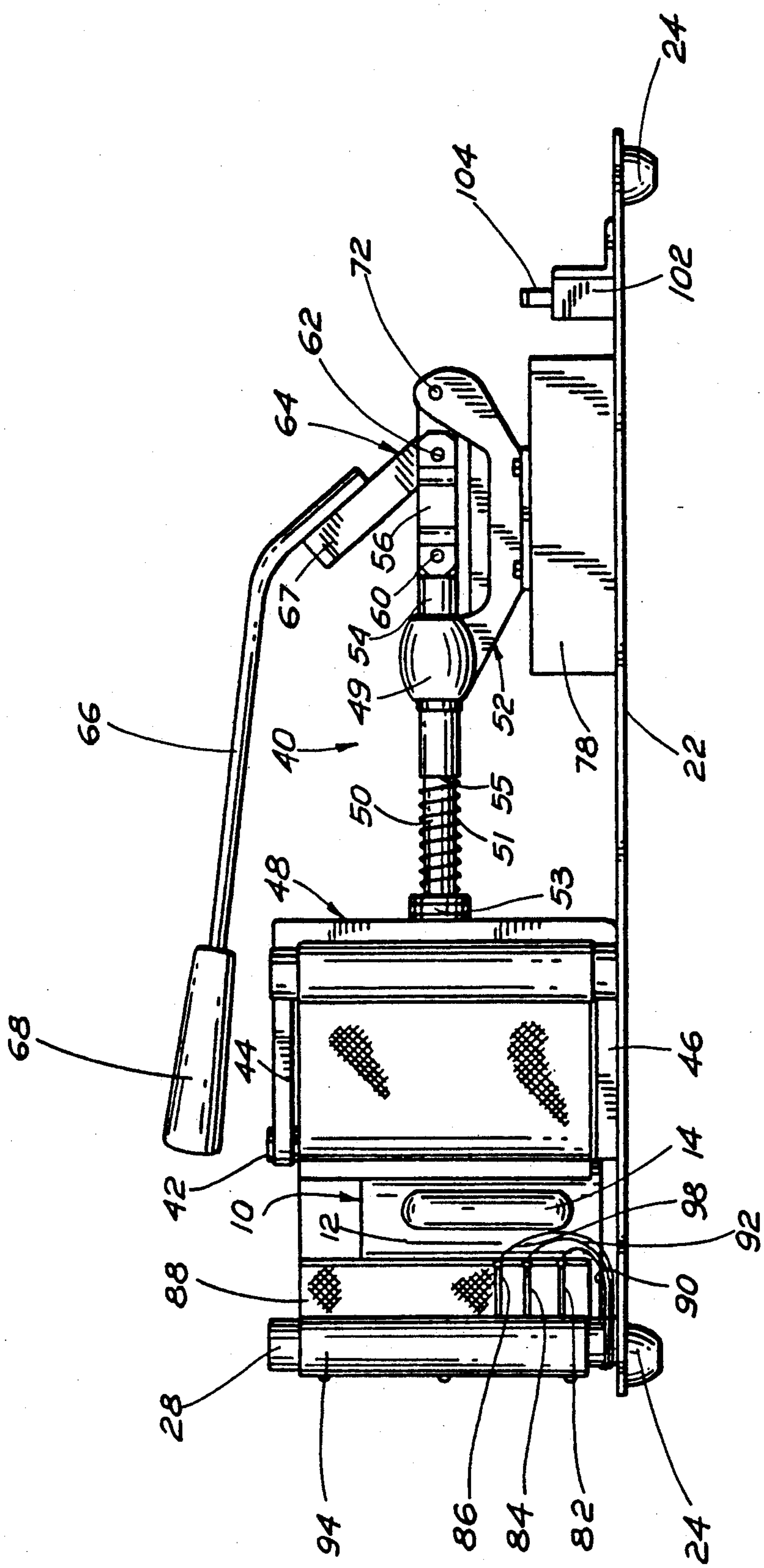
FIG. 3 is a view analogous to FIG. 2, but of the components in a use condition during decal affixation.

The pressing assembly 40 operates as follows:

An operator grasps the grip 68 and turns the handle 66 from its lowered state shown in FIG. 2, in a counter-clockwise direction about stationary pivot pins 72, to a raised state, shown in FIG. 3. The handle link 44 participates in this turning movement, thereby causing the pivot pins 62 to orbit around the stationary pivot pins 72. The forward movement of the orbiting pivot pins 62 transfers this turning motion to the stabilizer links 56, 58 which, in turn, displaces the drive shaft 50. The drive shaft is constrained to move horizontally due to the horizontal guide 49. The drive shaft 50 moves through the spring 51 and, in turn, displaces the stirrup 48 and the push bar 42 toward the left side of FIG. 2. During this leftward displacement of the push bar, the latter initially contacts the blanket at a contact region 80 (see FIG. 4) intermediate the opposite end regions of the blanket, and pushes the contact regions 80 to the left, thereby tensioning the blanket and causing the blanket to be tightly wrapped around the cup. The decal is firmly pressed against the cup by the taut blanket.

As best shown in FIG. 3, when the handle is in its raised state, the stabilizer links 56, 58 are aligned with the shaft 50. The pivot pins 62 are located on, and in a preferred embodiment are located slightly below, an imaginary line drawn between pivot pins 60, 72. This geometric orientation results in a so-called "over-the-center" locking action wherein all of the components of the assembly 40 remain in their respective positions, as shown in FIG. 3, until the operator affirmatively move the handle back toward its lowered condition.

The blanket 32 in the working condition, is tightly stretched against the cup, and is yieldably held against the cup by the aforementioned spring 51. The stirrup 48 actually moves slightly to the right side of FIG. 3, and compresses the spring when the working condition is reached. Depending upon the diameter of the cup 12, the spring will be compressed to a correspondingly greater or lesser extent, thereby enabling mugs of different sizes to be readily accommodated in the cavity formed by the blanket. The number and sizes of the aforementioned spacers 53 may also be selected as desired to accommodate mugs of different sizes and to adjust the tension of the spring 51.

Upon turning the handle in the clockwise direction toward its lowered state, the pivot pins 62 are raised above the aforementioned imaginary line between pivot pins 60, 72, and the handle link 64 pulls the twin stabilizer links 56, 58 and the drive shaft 50 back to their starting positions. The blanket is now, once again, held slackly against the cup so that the mug 10 can be readily removed.

While the blanket is stretched taut against the cup, the decal is heated in order to effect the transfer of the decal. This heating can be accomplished in many ways. It is currently preferred to generate heat from within the blanket by utilizing the electrical control circuitry shown in FIG. 6.

As best shown in FIG. 7, electrically-resistive elements 82, 84, which preferably can be constituted as thin metal foil printed on, or thin metallic wire, e.g. nichrome, mounted on, a carrier sheet 88 which is centrally located within the blanket. Electrical supply conductors 90, 92 convey electrical current to and from the electrically-resistive elements so as to generate heat within the blanket. An outer sheet 94 made of heat-resistant material covers one side of the carrier sheet. This outer sheet 94 protects the operator from injury, as well as protecting the resistive elements and their connections to the conductors 90, 92 from damage. Preferably, the outer sheet 94 is made of an elastomeric material, and is vulcanized onto the carrier sheet 88. The elastomeric nature of the outer sheet ensures a tight wrap for the blanket when it is stretched around the cup.

An inner sheet 96 is located on the opposite side of the carrier sheet, and is also made of a heatresistant material. The inner sheet 96 is preferably made of a material that is smooth to facilitate insertion of the cup into the cavity, and to ensure that uniform pressure will be applied against the entire area of the decal. TEFLON (trademark) meets the requirements for the inner sheet.

The resistive elements 82, 84 are embedded within the blanket, and are arranged in a pattern so as to cover uniformly the outer circumference of the cup. As shown, the elements are arranged in circumferentially-extending rows which are vertically spaced apart, one above another, at equal intervals along the height of the cup. Of course, other patterns are within the spirit of this invention.

Figure 6:
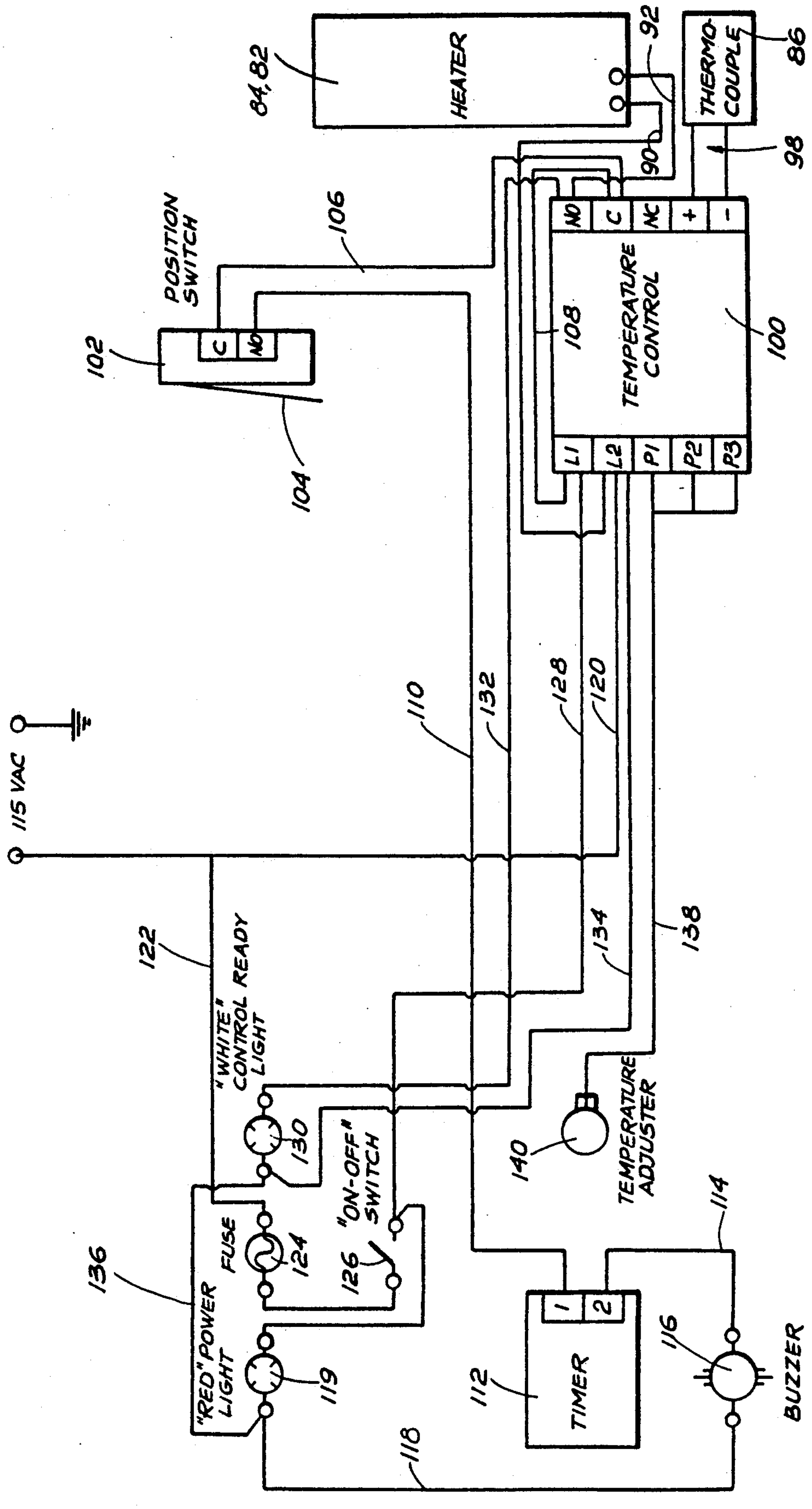
FIG. 6 is a wiring diagram of the electrical circuit used in the arrangement of FIG. 1.

Turning now to FIG. 6, a temperature control unit 100, whose operation is described in detail below, is a conventional temperature controller, and can be purchased from the Watlow Electric Manufacturing Co. of St. Louis, Mo., as its Model No. 80. The resistive elements 82, 84 are schematically represented in FIG. 6 by a box labeled "HEATER", and are connected by conductors 90, 92 to the input terminals labeled L2 and NO. A thermocouple 86 for measuring temperature at the blanket is also embedded within the blanket, and is connected by a multi-wire cable 98 to the input terminals labeled (+) and (−).

A position switch 102 having a normally open armature 104 has a normally open (NO) and a closed (C) terminal. The C terminal on the switch is connected by conductor 106 to a closed terminal (C) on the control unit 100. The C terminal on the control unit is connected by conductor 108 to another input terminal Ll. The NO terminal on the switch is connected by conductor 110 to one input of a timer 112. A second input of the timer 112 is connected by conductor 114 to one terminal of a buzzer 116, the other terminal of which is connected by conductor 118 to one side of a "red" power light 119.

A source of electrical power, e.g. 115 VAC, is connected by conductor 120 to input terminal L2 of the control unit, and by conductor 122 to a fuse 124 which, in turn, is connected through an "ON-OFF" switch 126 to the other side of the power light 119. The switch 126 is also connected by conductor 128 to input terminal Ll.

A "white" control ready light 130 has one side connected by conductor 132 to the NO terminal of the control unit, and its opposite side connected by conductor 134 to the L2 terminal of the control unit, as well as being connected by conductor 136 to the conductor 118.

A temperature adjustor 140 is connected via a three-wire cable 138 to input terminals P1, P2 and P3 of the control unit.

Before discussing the operation of the FIG. 6 circuit, attention is drawn to FIG. 4 wherein the armature 104 of the position switch 102 is shown in the path of turning movement of the handle link 64. The armature is depressed in the ready or handle-lowered condition of FIG. 2, and is constantly biased upwardly to the working or handle-raised condition of FIG. 3.

Figure 1:
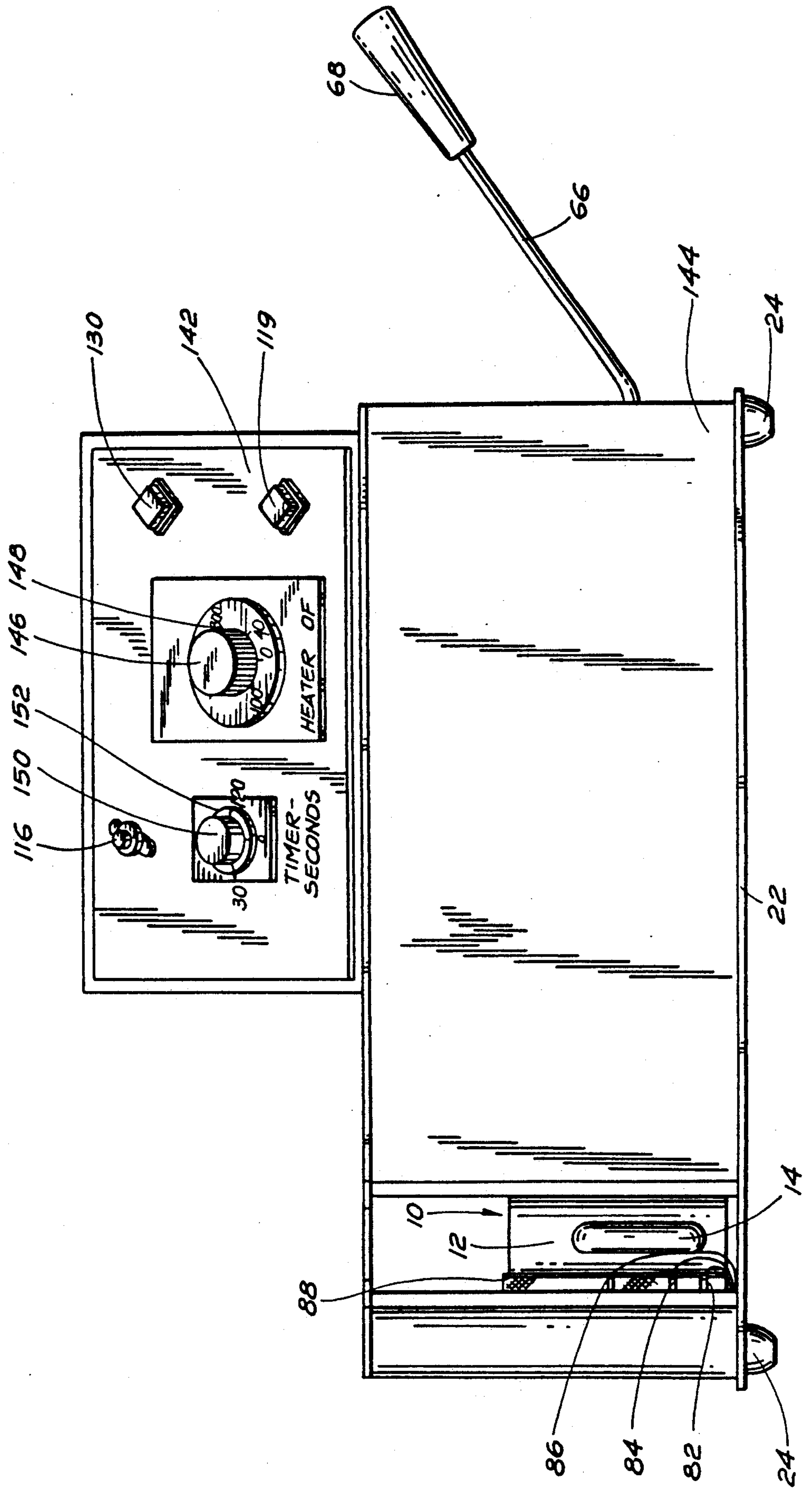
FIG. 1 is an elevational front view of the arrangement according to this invention.

Attention is also drawn to FIG. 1 wherein a sloped operating panel 142 is mounted above a housing 144 which, in turn, is mounted on the base 22 and houses the various electrical and mechanical components discussed above. A rotary temperature dial 146, surrounded by a circular scale 148 which is calibrated with temperature indicia in degrees Farenheit, is mounted on the panel, and is coupled to the temperature adjustor 140. The temperature dial 146 enables the operator to set, in advance, the temperature at which the heating of the decal will take place.

A rotary timer dial 150 surrounded by a circular scale 152 calibrated with time indicia in seconds and minutes, is also mounted on the operating panel 142, and is coupled to the timer 112. The timer dial 150 enables the operator to set, in advance, the duration of the heating of the decal.

The buzzer 116, the ready power light 119, and the white control light 130 are also mounted on the operating panel within ready hearing and sight of the operator.

The FIG. 6 circuit operates as follows:

First, the ON-OFF switch 126 is actuated to the ON position, thereby energizing the temperature control unit 100 and illuminating the ready power light 19, thereby visually alerting the operator that power has been turned on.

Next, the operator turns the temperature dial 146 to a predetermined temperature setting, e.g. 400° F. The control unit conducts an electrical current to and through the resistive elements 82, 84, thereby generating heat at the blanket. The control light 130 is lit as soon as this electrical current begins to flow. The thermocouple 86 within the blanket measures the temperature thereat and, as soon as the temperature reaches the predetermined temperature setting, the white control light 130 is extinguished. The extinguished white light advises the operator that the preset temperature has been achieved. In practice, the white light actually cycles on and off. The white light 130 is lit when the temperature lies within a working range in the vicinity of 400° F. and is extinguished when the temperature falls out of this range.

As soon as the operator notes the extinguishing of the control light 130, which, in a preferred case, occurs about 80 seconds after power has been turned on, the operator inserts the cup and the decal into the cavity formed by the slack blanket which, at this point, is strung freely between the anchor posts 28, 30. Once the cup has been inserted, the handle is turned to the left, as shown in FIG. 1, thereby tightly wrapping the blanket around the decal and the outer circumferential surface of the cup. As soon as the handle link 64 clears the armature of the position switch 102, the position switch actuates the timer 112 which has been pre-set to a predetermined time, e.g. 2 minutes, by the timer dial 150. The timer keeps track of the elapsed time and, once the pre-set time has passed, the timer generates an output signal which, in this case, causes the buzzer 116 to sound. The sounding of the buzzer advises the operator that the handle 66 should be returned to its starting position, and the mug removed.

Once the mug has been removed, the paper backing sheet 18 is peeled off. To prevent bleeding of the colored inks which comprise the picture or design of the decal sheet 16, the mug is quenched in a nearby pool of water.

It will be understood that each of the elements described above, or two or more together, also may find a useful application in other types of constructions differing from the types described above.

While the invention has been illustrated and described as embodied in an arrangement for and method of applying heat-transferrable decalcomania to mugs, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An arrangement for applying heat-transferrable decalcomania to a circumferential surface of a container, comprising:

(a) a flexible, sheet-like heating blanket;

(b) cover means for wrapping the flexible blanket around a major portion of the circumferential surface of the container over which the decalcomania has been laid, and for urging the blanket toward said major circumferential portion to press the decalcomania against said major circumferential portion, wherein said major circumferential portion extends around the container over an arc greater than 180 degrees; and (c) heater means for generating heat at the blanket sufficient to transfer the decalcomania to said major circumferential potion of the container;

the arrangement further comprising a support for stationarily mounting the container during operation of the heater means; and wherein the blanket has longitudinally spaced-apart regions stationarily mounted on the support, and a movable region located between the stationary spaced-apart regions;

wherein the cover means includes means for moving the movable region over a distance to a heating position in which the blanket is in close, intimate, heat-transfer contact with said major circumferential portion of the container; and wherein the spaced-apart regions of the blank are end regions extending past, and out of contact with, the container; and wherein the movable region of the blanket is a contact region in contact with, and pushed by, the moving means during movement to the heat position.

2. An arrangement for applying heat-transferrable decalcomania to a circumferential surface of a container, comprising:

(a) a flexible, sheet-like heating blanket;

(b) cover means for wrapping the flexible blank around a major portion of the circumferential surface of the container over which the decalcomania has been laid, and for urging the blank toward said major circumferential portion to press the decalcomania again said major circumferential portion, wherein said major circumferential portion extends around the container over an arc greater than 180 degrees; and (c) heater means for generating heat at the blanket sufficient to transfer the decalcomania to said major circumferential portion of the container;

the arrangement further comprising a support for stationarily mounting the container along an upright, generally vertical axis during operation of the heater means; and wherein the blanket extends axially along the container;

said cover means including means for moving the blanket between a non-heating position in which the blanket is spaced from said major circumferential portion of the containers, and a heating position in which the blanket is tightly held in close, intimate, heat-transfer contact with said major circumferential portion of the container; and wherein the blanket has a stationary position secured to the support, and a movable portion mounted for movement relative to the support; and wherein the moving means pushes the movable portion and tensions the blanket around said major circumferential portion.

3. The arrangement as recited in claim 2, wherein the moving means includes an axially-extending push bar, a user-operated handle displaceable between ready and working conditions, transmission means operatively coupled between the handle and the push bar, for moving he push bar toward and away from he movable portion of the blanket during handle displacement.

4. The arrangement as recited in claim 3, wherein the transmission means includes an elongated drive shaft extending along a transverse direction which is generally perpendicular to the push bar, a guide for guiding the drive shaft along the transverse direction, and a linkage between the handle and the drive shaft.

5. The arrangement as recited in claim 4, wherein the transmission includes means for adjustably mounting the push bar on the drive shaft for adjusting movement of the push bar relative to the drive shaft.

6. An arrangement for applying heat-transferrable decalcomania to a generally cylindrical cup of a mug, comprising:

(a) a flexible, sheet-like, heater blanket mounted on a support and bounding therewith an open cavity into which the cup is at least partly received, said blanket extending along a longitudinal axis that lies length-wise of the cup, said blanket also extending circumferentially about the axis around a major portion of the cup over an arc greater than 180°, said blanket sandwiching the decalcomania between itself and the major portion of the cup;

(b) two support posts stationary with respect to said support and connected to the ends of said blanket, said posts being positioned with respect to said cavity such that said blanket will encircle said cavity in excess of 180°, said blanket including a leader portion between said cavity and at least one of said support posts;

(c) means for pressing the blanket and, in turn, the decalcomania, into close, intimate, heat-transfer contact with the major portion of the cup; said pressing means including tensioning means adapted to push said leader portion of said blanket and applying pressure thereto to press said blanket into said hat-transfer contact; and (d) heater means for heating the blanket while the blanket is in contact with the cup and the decalcomania to transfer the latter to the major portion of the cup.

7. The arrangement as recited in claim 6, wherein cups of different diameter are respectively received in the cavity, and wherein the pressing means pushes the respective contact region through different distances corresponding to the diameter of the respective cup received in the cavity.

8. A method of applying heat-transferrable decalcomania to a circumferential surface of a container, comprising the steps of:

(a) positioning decalcomania around a major portion the circumferential surface of the container;

(b) wrapping a flexible, sheet-like, heating blanket around the decalcomania and the major circumferential portion of the container wherein the major circumferential portion extends around the container over an arc greater than 180 degrees;

(c) urging the blanket toward the major circumferential portion of the container to press the decalcomania against the major circumferential portion;

(d) generating heat at the blanket sufficient to transfer the decalcomania to the major circumferential portion of the container; and wherein the urging step is performed by stationarily mounting one end region of the blanket, and by pushing another region of the blanket away from said one end region to tauten the blanket and hold the blanket in intimate, close, heat-transfer relation with the major circumferential portion of the container.

* * * * *